(No Model.)
J. J. RIEDER.
SCREEN.
No. 448,370. Patented Mar. 17, 1891.
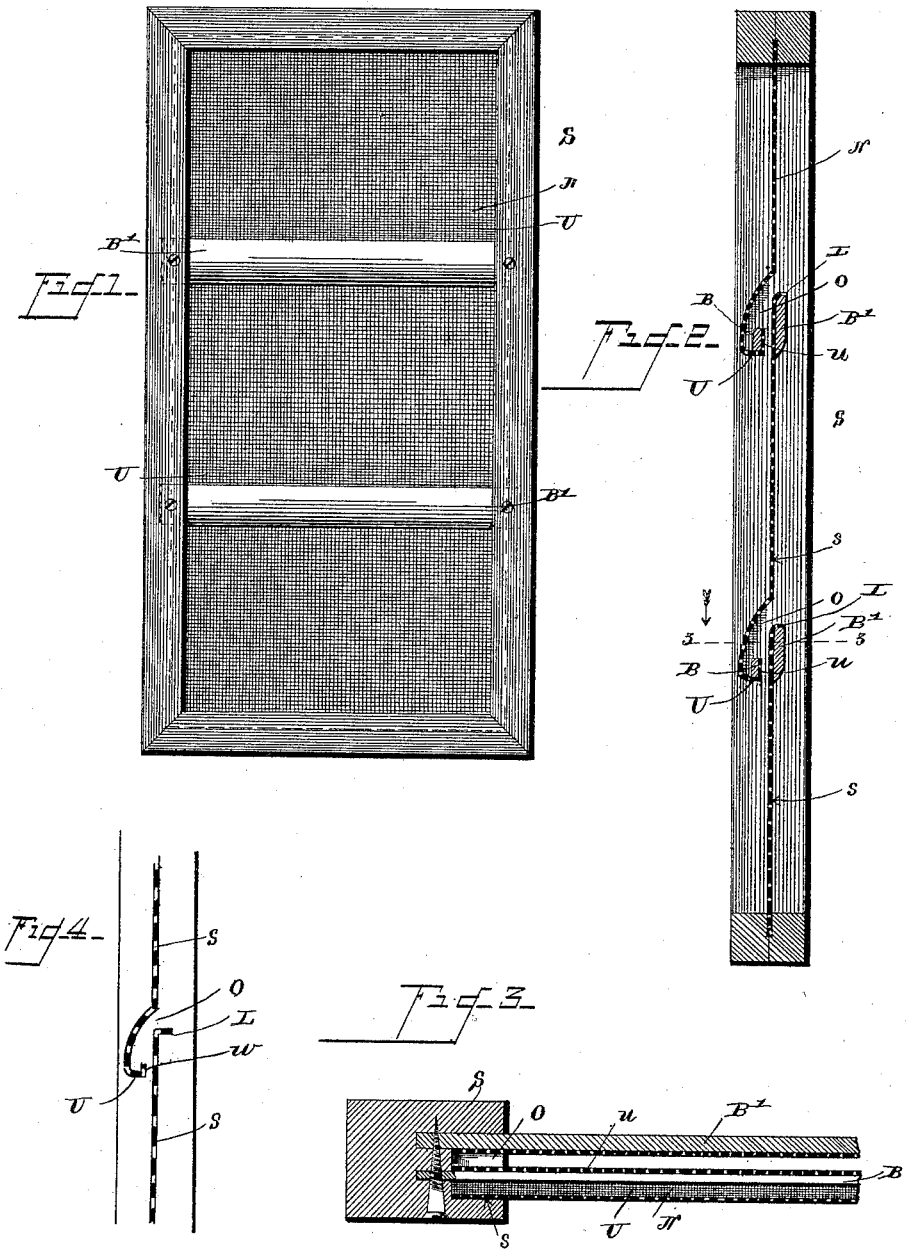
Witnesses
Geo. E. Fuch.
N. L. Collamer.
Inventor
John J. Rieder
By his Attorneys
C. A. Snow & Co.

UNITED STATES PATENT OFFICE.

JOHN J. RIEDER, OF FREDERICKSBURG, OHIO.

SCREEN.

SPECIFICATION forming part of Letters Patent No. 448,370, dated March 17, 1891.

Application filed April 5, 1890. Serial No. 346,658. (No model.)

*To all whom it may concern:*

Be it known that I, JOHN J. RIEDER, a citizen of the United States, residing at Fredericksburg, in the county of Wayne and State of Ohio, have invented a new and useful Screen, of which the following is a specification.

This invention relates to window and door screens used for the exclusion of flies and other insects.

The object of the invention is to take advantage of the well-known aptitude of such insects when lighting upon a vertical surface to crawl upward and to provide them an exit from but no entrance to the room.

To this end the invention consists in forming in the body of the screen horizontal openings, the upper and lower edges of the sections of netting respectively below and above said openings being turned over, so as to turn the insects back in their course and prevent their crawling through the passages in a direction which is not desired.

The following specification describes and the accompanying drawings illustrate what I consider the best manner of carrying out my invention.

In said drawings, Figure 1 is an inside elevation of my improved screen as applied to a window-sash, although it will be understood that it may be used upon screen-doors to equal advantage. Fig. 2 is a considerably enlarged central vertical section of Fig. 1. Fig. 3 is a transverse section on line 3 3 of Fig. 2. Fig. 4 is a section similar to Fig. 2, showing a portion of my preferred form of screen.

The letter S designates the window or door sash or frame, and N is the netting applied thereto with its body standing in a vertical plane. Said netting may be ordinary mosquito-netting, but is preferably of wire. At suitable points in the vertical height of the sash horizontal openings O are left in the netting, and the meeting edges of the sections above said openings are continued past said openings and formed as will now be described. The lower edge U of the upper section curves inwardly and passes down for some distance below the opening, and then curves upwardly again and toward the plane of the screen, as at *u*. A bar B, of wood or other material, may be attached to the extreme edge of this upwardly-curved bend if cloth netting is used, but is preferably omitted when the netting is of wire, because it would darken the room to a slight extent and might prevent so successful an operation of the device. The upper edge L of the lower section is turned outwardly from the plane of the netting just below the opening O and curved, as shown in Fig. 2, and, as above, if the netting be of cloth, a bar B' may be also here employed to give strength thereto, although it is preferably omitted.

The inner edges of the sash S may be provided with grooves *s*, in which the edges of the netting are seated, the ends of the bar B passing into holes therein at proper points and the ends of the strip B' extending beyond the depth of such grooves, and may be nailed or screwed into the sash, as shown in Fig. 3.

With a screen constructed as above described the insects upon the interior thereof as they crawl upward will find a free exit through the openings O, and will thus be allowed to pass from the room. However, if they light upon the outer face of the screen and crawl upward, they will come to the strip B' or the outwardly-curved edge L, and their course will be directed away from the screen, so that they will fly across the opening O and continue upward on the outer face of the screen. If, however, they should crawl downward, which is contrary to their nature, they will pass into the openings O, down the ends U, into and around the curved portions *u*, and their course be thereby directed again upwardly and out of the opening O. This improved screen will therefore permit the exit, but prevent the entrance, of flies and other insects to the house, and will serve a very important and desirable end for that reason.

I claim as the salient points of this invention—

1. The herein-described fly-screen, the same comprising a netting, its body standing in a vertical plane and having horizontal openings dividing it into sections, the lower edge of a section above an opening passing in rear of and below said opening and curving upwardly at its edge toward the plane of the netting, and the upper edge of a section below an opening curving outwardly, all said parts standing a distance apart sufficient to permit the passage of a fly therebetween, as and for the purpose set forth.

2. The herein-described fly-screen, the same comprising a netting, its body standing in a vertical plane and having horizontal openings dividing it into sections, the lower edge of a section above an opening passing in rear of and below said opening and curving upwardly at its edge toward the plane of the netting and the upper edge of a section below an opening curving outwardly, and strips secured to said edges and connected at their ends to the frame surrounding the whole, all said parts standing a distance apart sufficient to permit the passage of a fly therebetween, as and for the purpose set forth.

In testimony that I claim the foregoing as my own I have hereto affixed my signature in presence of two witnesses.

JOHN J. RIEDER.

Witnesses:
SILAS N. COE,
THOS. S. DUNLAP.